US011955250B2

(12) United States Patent
Kochergin

(10) Patent No.: US 11,955,250 B2
(45) Date of Patent: Apr. 9, 2024

(54) POROUS SILICON CHARGED PARTICLE, X-ray, GAMMA-RAY AND/OR THERMAL NEUTRON COLLIMATORS AND METHODS OF MANUFACTURING THE SAME

(71) Applicant: Vladimir Kochergin, Christiansburg, VA (US)

(72) Inventor: Vladimir Kochergin, Christiansburg, VA (US)

( * ) Notice: Subject to any disclaimer, the term of this patent is extended or adjusted under 35 U.S.C. 154(b) by 358 days.

(21) Appl. No.: 17/460,721

(22) Filed: Aug. 30, 2021

(65) Prior Publication Data

US 2023/0065517 A1 Mar. 2, 2023

(51) Int. Cl.
*G21K 1/02* (2006.01)

(52) U.S. Cl.
CPC .................................... *G21K 1/025* (2013.01)

(58) Field of Classification Search
CPC ...................................................... G21K 1/025
See application file for complete search history.

(56) References Cited

U.S. PATENT DOCUMENTS

| | | | | |
|---|---|---|---|---|
| 2011/0168978 A1* | 7/2011 | Kochergin | B82Y 10/00 257/15 |
| 2023/0014279 A1* | 1/2023 | Kochergin | G01T 1/24 |

* cited by examiner

*Primary Examiner* — Nicole M Ippolito

(57) ABSTRACT

The present invention relates to charged particle, X-ray, gamma ray and or thermal neutron collimators with improved UV, visible and IR blocking on the basis of micro structured semiconductor and method of making the same. In more detail, the present invention is related to three-dimensionally microstructured charged particle, X-ray, gamma ray and or thermal neutron collimators. The collimators of the present invention will improve the performance of telescopes, radiology equipment, nondestructive evaluation equipment and proton therapy equipment.

24 Claims, 3 Drawing Sheets

POROUS SILICON CHARGED PARTICLE, X-ray, GAMMA-RAY AND/OR THERMAL NEUTRON COLLIMATORS AND METHODS OF MANUFACTURING THE SAME

STATEMENT REGARDING FEDERALLY SPONSORED RESEARCH OR DEVELOPMENT

The invention was made with Government (NASA) support and the Government (NASA) has certain rights to this invention.

CROSS-REFERENCES TO RELATED APPLICATIONS

Application Number 63073582

FIELD OF THE INVENTION

The present invention relates to the design and method of fabrication of charged particle, X-ray, gamma-ray and/or thermal neutron collimators with improved ultraviolet and visible blocking and method of manufacturing the same. In more detail, the present invention is related to the design and method of manufacturing of charged particle, X-ray, gamma-ray and/or thermal neutron collimators with improved ultraviolet (UV) and visible blocking on the basis of three-dimensionally structured silicon templates conformally coated by high atomic number material optionally followed by conformal coating of dielectric coating to suppress UV and/or visible radiation. The collimators of the present invention will improve the performance of the cameras used in satellites, as well as in radiology equipment.

BACKGROUND OF THE INVENTION

Collimators are used in all X-ray, gamma-ray and particle detectors, in multiple thermal neutron detectors, as well as in multiple commercial applications that use X-ray, gamma-ray, charged particle (usually proton) or thermal neutron imaging to maximize the sensitivity, resolution and contrast of images (for some applications like nuclear and X ray medical imaging the antiscatter grid is more common abbreviation). The collimators permit minimization of transmission of scattered radiation as well as the radiation from off-axis sources, thus maximizing the sensitivity of the detectors to the useful signals from the sources being studied. While such devices are in use for many decades (see e.g., U.S. Pat. No. 3,543,384 by Hansen, filed Nov. 14, 1966), there is still a critical need for higher transmission, light weight, and vibration tolerant particle collimators for multiple NASA missions and other applications.

The most commonly used X-Ray and particle collimators are lead-glass microchannel plate (MCP) collimators. Such collimators are made by a draw and etch process similar to how optical fibers are produced: a lead-glass core is surrounded by a cladding glass, which is drawn, stacked, and fused several times to produce a block, which can be sliced, polished to the required thickness and etched to produce the finished collimators. The main issue with such collimators is the trade-off between the field-of-view, off-axis source blocking and transparency, stemming from combination of mechanical stability and relatively low effective Z of lead glass. Micromachinned collimators (see, e.g., [O. V. Makarova et al., Microsyst Technol (2008) 14:1613-1619], [M. Christophersen et al., JLMN-Journal of Laser Micro/Nanoengineering Vol. 8, No. 2, p. 183(2013)]) represent an attractive alternative to the MCP collimators due to the potential to achieve both higher off-axis blocking for the same field-of-view, higher geometrical transmission, and lower weight for the same performance, however, up to date the fabrication process of such collimators was rather challenging due to high thicknesses of the structure, more than order of magnitude higher than what is typical for microfabrication, thus requiring the use of exotic processes such as X-ray lithography, laser machining, special photoresist dispensing tools, etc.

US patent application US 2010/0123085, U.S. Pat. Nos. 7,333,701, 9,941,438, 8,835,864, and 8,507,872 are teaching the use of microchannel plates (MCP) for neutron collimation and detection. However, as reviewed above, MCP technology has a number of limitations.

Collimators produced by additive manufacturing also known as 3D printing are heavily used for gamma ray collimation and offer high level of collimation performance (see, e. g., U.S. Pat. No. 10,408,947 by Beacham, et al. issued on Sep. 10, 2019 and references therein). The main disadvantage of collimators made by additive manufacturing technique is relatively large feature size (sub-mm feature sizes are challenging and very expensive to fabricate of metals with 3D printing) and thus complete absence of VUV-visible-IR transmission.

For a nonlimiting example, in NASA applications efficient UV and visible blocking is required for charged particle (solar wind) detection, as particle detectors are sensitive to the UV and/or visible light as well, and detectors without VUV-visible photon blocking are saturated especially by photons of Lyman-α line. The blocking of Ly-α and visible photos is usually accomplished by addition of either thin foil or very thin fine pitch grating structure, which causes deterioration in the particle transmission characteristics (especially low energy charged particles as in solar wind) and is also very mechanically unstable.

To conclude, new designs of particle collimator that would improve particle collimator performance, improve UV and/or visible light blocking without sacrificing X-ray and particle transmission would be highly beneficial for astronomy and other applications.

SUMMARY OF THE INVENTION

It is an object of the present invention to provide a new design and method of fabrication of charged particle, X-ray, gamma and/or thermal neutron collimator devices with improved Vacuum Ultra Violet (VUV), ultra violet (UV), visible (VIS), infrared (IR), terahertz (THz) and/or microwave blocking utilizing of porous Silicon material with improved mechanical and environmental stability, improved performance and practical/cost-effective method of fabrication of such a devices.

According to the first embodiment of the present invention, an improved charged particle, X-ray, gamma and/or thermal neutron collimator with improved Vacuum Ultra Violet (VUV), ultra violet (UV), visible (VIS), infrared (IR), terahertz (THz) and/or microwave blocking consists of the at least one layer of three-dimensionally structured semiconductor substrate having the host material with surface (or walls) and removed material, or pores of predetermined size (less than 20 μm in cross-section), shape and arrangement, with at least one layer of another material deposited on the pore walls, with properties and thicknesses chosen such as the structure possess desired Vacuum Ultra Violet (VUV), ultra violet (UV), visible (VIS), infrared (IR), terahertz (THz) and/or microwave photon blocking. The porous semiconductor substrate according to this embodiment of the present invention is fabricated by means of electrochemical etching of single crystalline silicon wafer. By adjusting the pore cross-section, spacing and length controllable charged particle, X-ray, gamma and/or thermal neutron collimation is achievable, while by adjusting the pore cross-section and pore wall coating material(s) and thickness(s) the controllable attenuation of VUV, UV, VIS, IR, THz and/or microwave photon blocking is obtained. Such a collimator design is particularly suitable for relatively low energy charged particle collimation (for a nonlimiting example, up to 9 MeV for α-particles and protons).

According to the second embodiment of the present invention, an improved charged particle, X-ray, gamma and/or thermal neutron collimator with improved VUV, UV, VIS, IR, THz and/or microwave blocking consists of the at least two layers of three-dimensionally structured semiconductor substrates, with at least one substrate having the host material with surface (or walls) and removed material, or pores of predetermined size (less than 20 μm in cross-section), shape and arrangement, with at least one layer of another material deposited on the pore walls, with properties and thicknesses chosen such as the structure possess desired Vacuum Ultra Violet (VUV), ultra violet (UV), visible (VIS), infrared (IR), terahertz (THz) and/or microwave photon blocking. Said porous semiconductor substrates according to this embodiment of the present invention are fabricated by means of electrochemical etching of single crystalline silicon wafer. According to the present embodiment, each layer has substantially (at least 2 times) different pore sizes and pitches (periods) in each of the layer, such as multiple pores in subsequent layer can be positioned in front of each pore in a previous layer. The method of fabrication of each layer of macroporous Si is essentially the same as discussed in relation to the first embodiment of the present invention. With such a collimator design, collimators can be used at sizably (by times if several layers in a stack are used) larger energies than with single layer design. For a nonlimiting example of proton collimator such a design is particularly advantageous for strong collimation up to ~20 MeV energy range.

According to the third embodiment of the present invention, an improved charged particle, X-ray, gamma and/or thermal neutron collimator with improved VUV, UV, VIS, IR, THz and/or microwave blocking consists of the at least two layers of three-dimensionally structured substrates, with at least one substrate being a semiconductor substrate having the host material with surface (or walls) and removed material, or pores of predetermined size (less than 20 μm in cross-section), shape and arrangement, with at least one layer of another material deposited on the pore walls, with properties and thicknesses chosen such as the structure possess desired Vacuum Ultra Violet (VUV), ultra violet (UV), visible (VIS), infrared (IR), terahertz (THz) and/or microwave photon blocking, with another substrate being produced by method of additive manufacturing (also known as 3D printing) from metal for high energy collimation with pores (or holes) with cross-section in the range of 0.1 mm to about 20 mm Said porous semiconductor substrate according to this embodiment of the present invention is fabricated by means of electrochemical etching of single crystalline silicon wafer and its main purpose is to suppress Vacuum Ultra Violet (VUV), ultra violet (UV), visible (VIS), infrared (IR), terahertz (THz) and/or microwave photon transmission. The method of fabrication of the layer of macroporous Si is essentially the same as discussed in relation to the first embodiment of the present invention. The layer fabricated by additive manufacturing is preferably made with relatively high atomic number material and its purpose is high energy charged particle, X-ray, gamma and/or thermal neutron collimation. With such a collimator design, collimators can be used at large energies while maintaining high rejection of Vacuum Ultra Violet (VUV), ultra violet (UV), visible (VIS), infrared (IR), terahertz (THz) and/or microwave photon. For a nonlimiting example of proton collimator such a design is particularly advantageous for strong collimation up to ~100 MeV energy range.

BRIEF DESCRIPTION OF THE DRAWINGS

These and other features and advantages of presently preferred non-limiting illustrative exemplary embodiments will be better and more completely understood by referring to the following detailed description in connection with the drawings, of which.

DETAILED DESCRIPTION OF THE INVENTION

Figure 1:
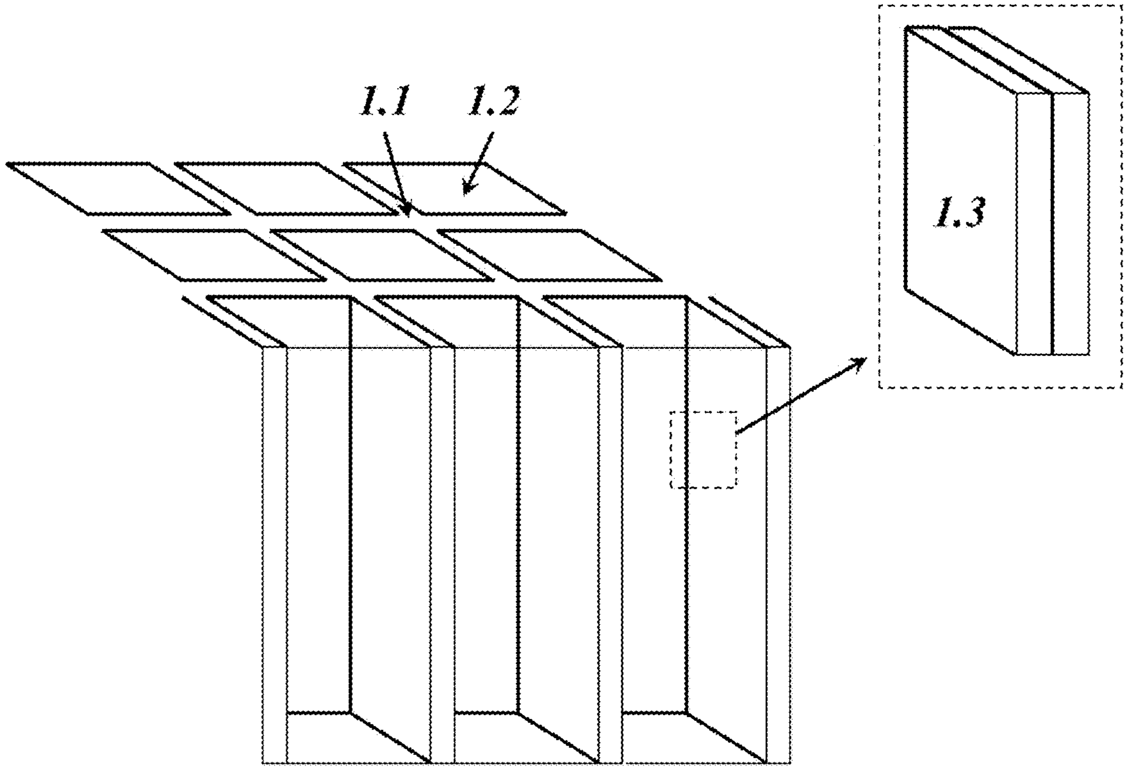
FIG. 1 is an exemplary diagrammatic drawing of the charged particle, X-ray, gamma-ray and/or thermal neutron collimator according to the first embodiment of the present invention.

According to the first embodiment of the present invention the an improved charged particle, X-ray, gamma and/or thermal neutron collimator with improved Vacuum Ultra Violet (VUV), ultra violet (UV), visible (VIS), infrared (IR), terahertz (THz) and/or microwave blocking, on the basis of macroporous Silicon, illustrated in FIG. 1. It consists of the at least one layer of three-dimensionally structured substrate having the host material with surface (or walls) 1.1 and removed material, or pores 1.2 of predetermined size, shape and arrangement, with at least one layer of another material 1.3 deposited on the pore walls, with properties and thicknesses chosen such as the structure possess desired Vacuum Ultra Violet (VUV), ultra violet (UV), visible (VIS), infrared (IR), terahertz (THz) and/or microwave photon blocking. The porous substrate according to this embodiment of the present invention is fabricated by means of electrochemical etching of single crystalline silicon wafer. For a nonlimiting example, said substrate can comprise a layer of macroporous silicon electrochemically etched on silicon substrate by methods known to those skilled in the art with pore aspect ratio in the range of 10 to 1000 and pore cross-section in the range of 200 nm and 50 μm. The pore walls can be additionally smoothed by adding additional anisotropic wet chemical etching step after the electrochemical etching step. The conformal deposition of at least one layer of material 1.3 conformally coating the pores walls can be performed by one or more techniques selected from the group consisted of Chemical Vapor Deposition (CVD) technique or some of its variations (such as, for a nonlimiting example Low Pressure CVD, or Metal Organic CVD), by Atomic Layer Deposition (ALD), by electrochemical and/or electroless plating. The collimation in such a devise is achieved by transmission of the particles or waves through the pores at angles of incidence within the field of view of the pore, and by absorption of the particles or waves in material in the coated pore wall at angles of incidence larger than the field of view of the pore. By adjusting the pore size, spacing and pore wall coating thickness the controllable collimation in the range of sub-0.1° to >10° can be achieved over wide energy range. For a nonlimiting example of alpha particles, such a collimation can be achieved in the range of few 10s of eV to at least 6 MeV.

For a nonlimiting example, the macroporous silicon is grown on p-doped (100) oriented double side polished silicon substrate with resistivity in the range of 30 and 100 Ohm cm with preliminary fabricated array of depressions or etch pits, said etch pits being fabricated by thermal oxidation of silicon wafer, photolithography, chemical etching of oxide layer through photoresist mask with reactive ion etching and then etching said etch pits in 40% KOH aqueous solution at 60 to 100° C. temperature with oxide being removed in HF solution after etch pit definition. Said silicon wafer with defined etch pits is being coated by the contact layer from the back side (i.e., the side which does not have the etch pits) and being placed in electrochemical etching cell with electrolyte made of 5 to 10% HF, 10 to 30% ethanol and 60 to 85% diemethylsulfoxide and the current density of between 2 $mA/cm^2$ to 20 $mA/cm^2$ being applied for 30 min to 20 hours, when the macroporous silicon layer is being etched. According to this illustrative example, after the completion of electrochemical etching the backside electric contact layer is being stripped by wet chemical etching (for example, if the back contact is of gold, Aqua Regina can be used). Further, the pore walls can be smoothened by exposing the etched macroporous silicon layer to diluted KOH/$H_2O$/ethanol solution at temperatures between 8° C. and 60° C. The wafer with formed macroporous silicon layer can be then placed in Atomic Layer Deposition machine and $Al_2O_3$ layer with, for a nonlimiting example, 90 Å to 130 Å thickness is formed. Alternatively, the pore wall coating by 90 Å to 130 Å thick $SiO_2$ layer can be performed by thermal oxidation, for a nonlimiting example, in dry atmosphere at 1000° C. for 50 minutes. Formation of such layers will suppress reflection of Ly-α photons from the pore walls. Either 1$^{st}$ or both surfaces of the wafer can be directionally (by, for example, e-beam sputtering) coated by one or more layers of metals, for a nonlimiting example, by Cr/Au or other metal coating to extend the blocking into IR, THz and/or microwave range.

Figure 2:
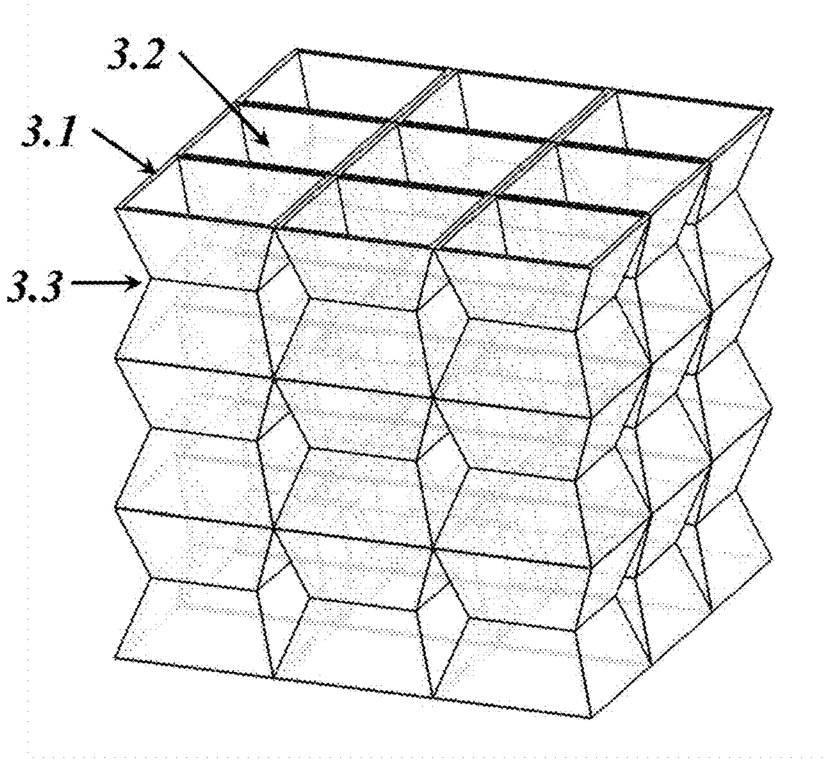
FIG. 2 is an exemplary diagrammatic drawing of the charged particle, X-ray, gamma-ray and/or thermal neutron collimator with modulated pore diameters to suppress charged particle, X-ray, gamma-ray and/or thermal neutron reflection from the pore walls.

To further suppress unwanted X-ray, charged particle or thermal neutron reflection from the pore walls, the diameter of the pores can be modulated, as illustrated in FIG. 2. In such a case the pore 2.2 formed in a host 2.1 has pore modulation amplitude and period 2.3. As such, the X-rays, charged particles or thermal neutrons specularly reflected from the pore walls at grazing angles (at which, for example of thermal neutrons and X-rays due to total internal reflection the reflectivity is nearly perfect) will be directed toward the pore wall during 2$^{nd}$ reflection at angles significantly exceeding high reflectivity grazing angles, thus leading to absorption of such particles or waves. Such a structure can be formed by employing current modulation during electrochemical etching of p-doped Si, backside intensity modulation during electrochemical etching of n-type Si or by any other means known to those skilled in the art.

Figure 3:
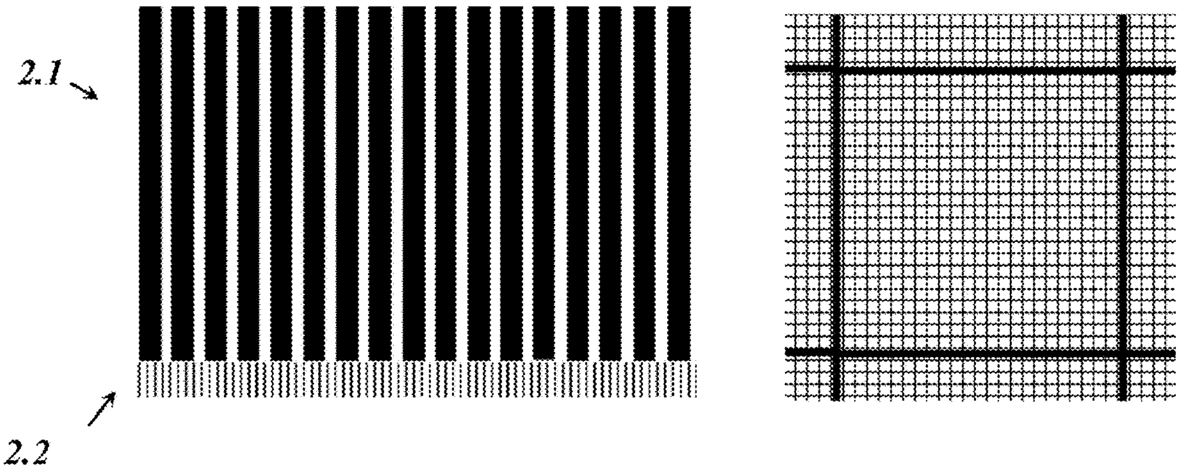
FIG. 3 is an exemplary diagrammatic drawing of the charged particle, X-ray, gamma-ray and/or thermal neutron collimator according to the second embodiment of the present invention.

According to the second embodiment of the present invention, illustrated in FIG. 3, an improved charged particle, X-ray, gamma and/or thermal neutron collimator with improved Vacuum Ultra Violet (VUV), ultra violet (UV), visible (VIS), infrared (IR), terahertz (THz) and/or microwave blocking consists of the at least two layers (called a "stack") of three-dimensionally structured substrates as disclosed in relation to the first embodiment, 3.1 and 3.2, and optionally more layers can be used. Each layer has substantially (at least 2 times) different pore sizes and pitches (periods) in each of the layer, as illustrated in FIG. 3 such as multiple pores in subsequent layer can be positioned with each pore in previous layer. The field of view (or the aspect ratio, measured as a ration of the pore depth by the pore cross-section) is preferably similar in each layer in the stack. In such a case the field of view of the collimator stack will be equal to the field of view of each layer in a stack. With such a collimator design the energy range of the collimator can be increased compared to the single layer collimator of the first embodiment.

According to the third embodiment of the present invention, an improved charged particle, X-ray, gamma and/or thermal neutron collimator with improved Vacuum Ultra Violet (VUV), ultra violet (UV), visible (VIS), infrared (IR), terahertz (THz) and/or microwave blocking consists of the at least two layers (called a "stack") of three-dimensionally structured substrates, one of said substrates is of structure as disclosed in relation to the first embodiment, and another substrate is made by additive manufacturing (also known as 3D printing) and has pores with cross-section in the range of 0.1 mm and 5 mm and the pore length in the range of 5 mm and 100 mm With such a collimator design the energy range of the collimator can be increased compared to the porous Silicon collimators of the first and second embodiment. For a nonlimiting example of stainless steel 3D printed collimator with 70 mm pore length, 0.8 mm×0.8 mm pore cross-section, 1 mm pore period the collimator can maintain its collimation properties for α-particles with energies up to 40 MeV or higher. In such a collimator design, the main purpose of 3D structured semiconductor substrate is to provide the Vacuum Ultra Violet (VUV), ultra violet (UV), visible (VIS), and infrared (IR) blocking.

Figure 4:
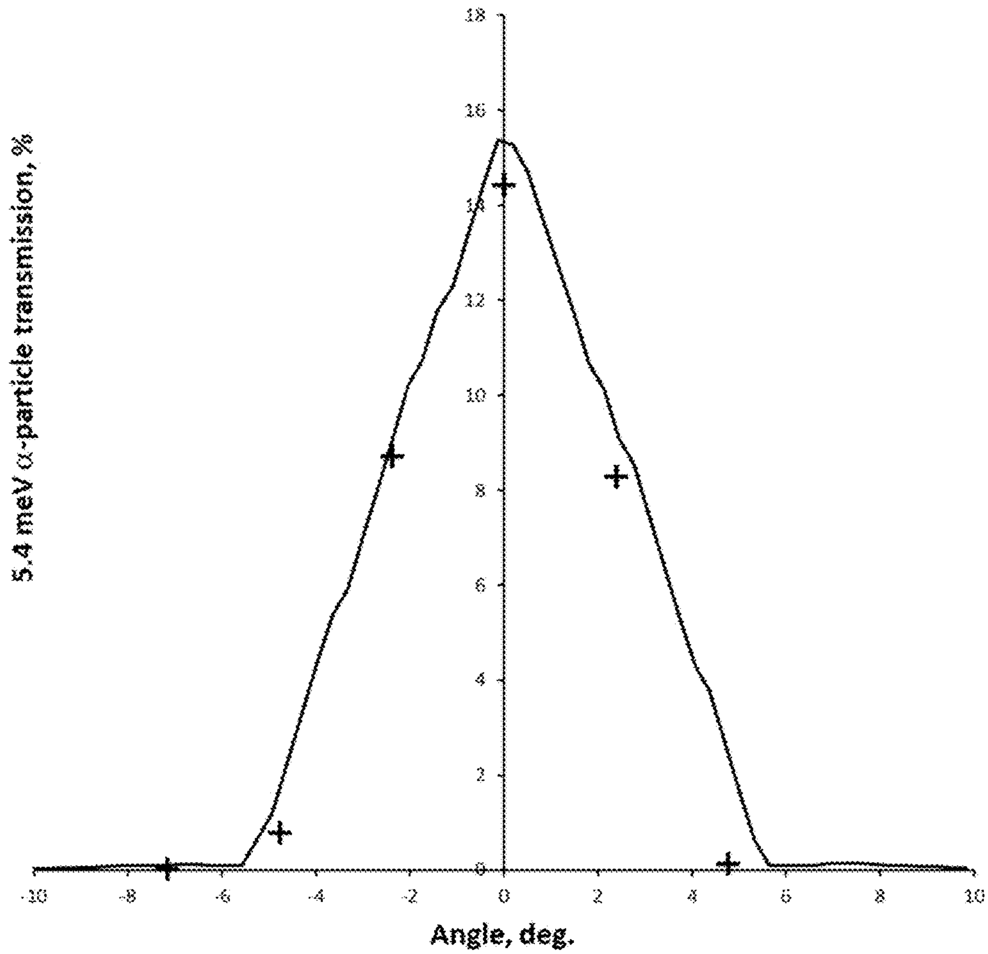
FIG. 4 is a plot showing angular dependence of the 5.4 MeV α-particle transmittance through the collimator according to the second embodiment of the present invention, black dots are experimentally recorded transmittance values while black curve is Monte Carlo model prediction.
Figure 5:
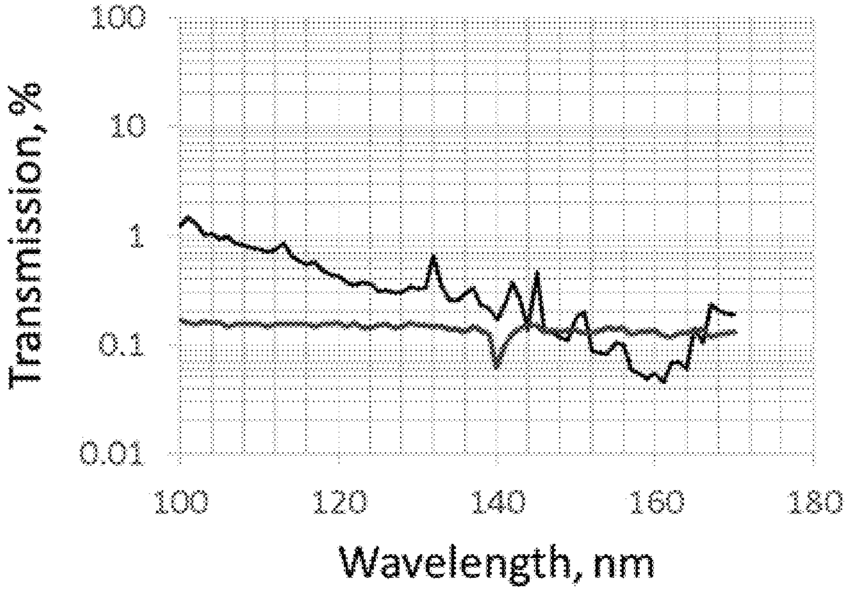
FIG. 5 is a plot showing Vacuum Ultra Violet photon transmittance spectra through the collimator according to the second embodiment of the present invention, black curve is experimentally recorded transmittance curve while the red curve is approximate numerical model prediction.

The charged particle collimation and improved VUV blocking of collimators of present invention is confirmed experimentally as illustrated in FIG. 4 which shows the 5.4 MeV α-particle transmission through single layer collimator, comprising Ni/Au coated macroporous Si membrane with 20 μm×20 μm period, 17.5 μm×1750 μm square pores, 180 μm thick. The Monte-Carlo simulation curve also is provided in FIG. 4 showing near perfect overlap with experimental results. FIG. 5 illustrates the efficient VUV blocking of the macroporous Si collimator with 1 μm×1 μm pores, where experimental results show close (although not perfect) resemblance with theoretical ray tracing model.

The charged particle, X-ray, gamma and/or thermal neutron collimators of the present invention hold a number of advantages over the prior art collimators: 1) improved Ly-α, UV, vis, IR and/or microwave blocking, 2) good thermal stability, 3) cost effectiveness, 4) low mass, 5) good mechanical stability. For a nonlimiting example of 3D printed mesh as most common gamma-ray collimator material at present, the visible light transmission is very high (>60%), meaning noise in the detectors due to photons has to be filtered. With collimators of the present invention effective photon attenuation from GHz frequency up to 10s of eV is possible, while effectively collimating 10s of keV gamma rays.

Applications of charged particle, X-ray, gamma and/or thermal neutron collimators of the present invention are expected in NASA missions (in telescopes), in radiology, plasma studies, nuclear material detection and many more.

While the invention has been described in connection with what is presently considered to be the most practical and preferred embodiment, it is to be understood that the invention is not to be limited to the disclosed embodiments. Therefore, the metes and bounds of invention are defined by the claims—not by this specification—and are intended to cover various modifications and equivalent arrangements included within the scope of those claims.

What is claimed is:

1. An X-ray, gamma ray, charged particle and/or thermal neutron collimator device comprising:

a semiconductor substrate or host wafer having an array of substantially uniform parallel hollow pores there through, the pores having characteristic lateral dimensions in the plane of the host wafer within the range of from about 0.1 μm to about 10 μm, said wafer having first and second surfaces substantially perpendicular to the axis of the pores, wherein the walls of each pore are conformally coated with at least one layer of material different than that of the host wafer, and wherein the thickness of each of said layers of transparent material is at least 5 nm, the thickness of semiconductor substrate is within the range of from about 50 μm to about 750 μm.

2. The X-ray, gamma ray, charged particle and/or thermal neutron collimator device of claim 1, wherein the wafer is comprised at least partially of porous semiconductor material.

3. The X-ray, gamma ray, charged particle and/or thermal neutron collimator device of claim 2, wherein the wherein said porous semiconductor material is macroporous silicon.

4. The X-ray, gamma ray, charged particle and/or thermal neutron collimator device of claim 1, wherein the X-ray, gamma ray, charged particle and/or thermal neutron transmission at desired energies is taking place though uncoated portion of the pore, while the X-ray, gamma ray, charged particle and/or thermal neutrons passing through semiconductor host and/or pore wall coating are absorbed.

5. The X-ray, gamma ray, charged particle and/or thermal neutron collimator device of claim 1, wherein the at least one layer of material conformally coating the pore walls is chosen from the group consisting of Ag, Al, Cu, Ni, Fe, Au, In, Ir, Sn, Pt, Pd, Rh, Ru, and conducting oxides, nitrides and oxynitrides of metals.

6. The X-ray, gamma ray, charged particle and/or thermal neutron collimator device of claim 1, wherein the vacuum ultraviolet, ultraviolet, visible, infrared, THz and/or microwave absorption at desired energies in said substrate is taking place though one or more of the following phenomena: 1) absorption in the pore walls by host material and pore wall coating, 2) diffraction on first and second surfaces of semiconductor substrate, and 3) reflection from the pores of photons with wavelengths exceeding the pore cross-section.

7. The X-ray, gamma ray, charged particle and/or thermal neutron collimator device of claim 1, wherein the pore diameter is modulated such as reflection of X-rays, gamma rays, charged particles and/or thermal neutrons from the pore walls is suppressed.

8. An X-ray, gamma ray, charged particle and/or thermal neutron collimator device comprising:

At least two semiconductor substrates or host wafers positioned on the top of each other, Wherein semiconductor substrates are having an arrays of substantially uniform parallel hollow pores there through, the pores having characteristic lateral dimensions in the plane of the host wafers substantially different between at least two host wafers by at least a factor of two between each pair of host wafers, Wherein the pores in semiconductor substrates are within the range of from about 0.1 μm to about 20 μm, said host wafers having first and second surfaces substantially perpendicular to the axis of the pores, the thicknesses of semiconductor substrates are within the range of from about 50 μm to about 750 μm.

9. The X-ray, gamma ray, charged particle and/or thermal neutron collimator device of claim 8 wherein the walls of each pore in at least one semiconductor substrate are conformally coated with at least one layer of material with atomic number higher than that of the host wafer, and wherein the thickness of each of said layers of transparent material is at least 5 nm.

10. The X-ray, gamma ray, charged particle and/or thermal neutron collimator device of claim 8, wherein the host wafers is comprised at least partially of porous semiconductor material.

11. The X-ray, gamma ray, charged particle and/or thermal neutron collimator device of claim 10, wherein the wherein said porous semiconductor material is macroporous silicon.

12. The X-ray, gamma ray, charged particle and/or thermal neutron collimator device of claim 8, wherein the X-ray transmission at low X-ray energies is taking place though overlapped portions of the pores in individual substrates, while the X-rays passing through semiconductor hosts and/or pore wall coatings in each of the substrates are absorbed.

13. The X-ray, gamma ray, charged particle and/or thermal neutron collimator device of claim 8, wherein the at least one layer of material conformally coating the pore walls in at least one semiconductor substrate is chosen from the group consisting of Ag, Al, Cu, Ni, Fe, Au, In, Ir, Sn, Pt, Pd, Rh, Ru, and conducting oxides, nitrides and oxynitrides of metals.

14. The X-ray, gamma ray, charged particle and/or thermal neutron collimator device of claim 8, wherein the vacuum ultraviolet, ultraviolet, visible, infrared, THz and/or microwave absorption at desired energies in at least one of said substrates is taking place though one or more of the following phenomena: 1) absorption in the pore walls by host material and pore wall coating, 2) diffraction on first and second surfaces of semiconductor substrate, and 3) reflection from the pores of photons with wavelengths exceeding the pore cross-section.

15. The X-ray, gamma ray, charged particle and/or thermal neutron collimator device of claim 8, wherein the pore diameter is modulated in at least one of said substrates such as reflection of X-rays, gamma rays, charged particles and/or thermal neutrons from the pore walls is suppressed.

16. An X-ray, gamma ray, charged particle and/or thermal neutron collimator device comprising:

At least two substrates or host wafers positioned on the top of each other,

Wherein at least one said substrate is made by additive manufacturing,

Wherein said substrate made by additive manufacturing is having an array of substantially uniform parallel hollow pores there through, the pores having characteristic lateral dimensions in the plane of the host wafers Wherein the pores in said substrate made by additive manufacturing are within the range of from about 0.1 mm to about 20 mm, Wherein at least one said substrate is a semiconductor substrate, Wherein said semiconductor substrate is having an array of substantially uniform parallel hollow pores there through, the pores having characteristic lateral dimensions in the plane of the host wafer;

Wherein the pores in said semiconductor substrate are within the range of from about 0.1 μm to about 20 μm, Wherein said substrates having first and second surfaces substantially perpendicular to the axis of the pores, Wherein said pores are of regular shapes and are spatially ordered across said surfaces of the wafer thus forming ordered pore arrays.

17. The X-ray, gamma ray, charged particle and/or thermal neutron collimator device of claim 14 wherein said ordered pore array order is chosen from the square and trigonal symmetry.

18. The X-ray, gamma ray, charged particle and/or thermal neutron collimator device of claim 14 wherein the walls of each pore in at least one semiconductor substrate are conformally coated with at least one layer of material with atomic number higher than that of the host wafer, and wherein the thickness of each of said layers of transparent material is at least 10 nm.

19. The X-ray, gamma ray, charged particle and/or thermal neutron collimator device of claim 14, wherein the semiconductor substrate is comprised at least partially of porous semiconductor material.

20. The X-ray, gamma ray, charged particle and/or thermal neutron collimator device of claim 17, wherein the wherein said porous semiconductor material is macroporous silicon.

21. The X-ray, gamma ray, charged particle and/or thermal neutron collimator device of claim 14, wherein the X-ray transmission at low X-ray energies is taking place though overlapped portions of the pores in individual substrates, while the X-rays, gamma rays, charged particles and/or thermal neutrons are passing through semiconductor hosts and/or pore wall coatings in each of the substrates are absorbed.

22. The X-ray, gamma ray, charged particle and/or thermal neutron collimator device of claim 14, wherein the at least one layer of material conformally coating the pore walls in at least one semiconductor substrate is chosen from the group consisting of Ag, Al, Cu, Ni, Fe, Au, In, Ir, Sn, Pt, Pd, Rh, Ru, and conducting oxides, nitrides and oxynitrides of metals.

23. The X-ray, gamma ray, charged particle and/or thermal neutron collimator device of claim 14, wherein the vacuum ultraviolet, ultraviolet, visible, infrared, THz and/or microwave absorption at desired energies in at least one of said semiconductor substrates is taking place though one or more of the following phenomena: 1) absorption in the pore walls by host material and pore wall coating, 2) diffraction on first and second surfaces of semiconductor substrate, and 3) reflection from the pores of photons with wavelengths exceeding the pore cross-section.

24. The X-ray, gamma ray, charged particle and/or thermal neutron collimator device of claim 14, wherein the pore diameter is modulated in at least one of said semiconductor substrates such as reflection of X-rays, gamma rays, charged particles and/or thermal neutrons from the pore walls is suppressed.

* * * * *